(12) United States Patent
Perosky et al.

(10) Patent No.: US 9,719,564 B2
(45) Date of Patent: Aug. 1, 2017

(54) SYNCHRONIZER RE-ENERGIZATION FOR IMPROVED COLD SHIFT COMFORT

(75) Inventors: Edward Perosky, Sterling Heights, MI (US); Lawrence Laba, Lake Orion, MI (US); Christopher J. Stiefel, Dryden, MI (US)

(73) Assignee: FCA US LLC, Auburn Hills, MI (US)

( * ) Notice: Subject to any disclaimer, the term of this patent is extended or adjusted under 35 U.S.C. 154(b) by 1802 days.

(21) Appl. No.: 12/644,783

(22) Filed: Dec. 22, 2009

(65) Prior Publication Data
US 2011/0146433 A1 Jun. 23, 2011

(51) Int. Cl.
F16D 23/06 (2006.01)

(52) U.S. Cl.
CPC .......... *F16D 23/06* (2013.01); *F16D 23/0612* (2013.01); *F16D 2023/0631* (2013.01); *Y10T 74/19284* (2015.01)

(58) Field of Classification Search
CPC ............................ F16D 23/06; F16D 23/0612
USPC .................... 74/335, 339; 192/53.34, 53.341
See application file for complete search history.

(56) References Cited

U.S. PATENT DOCUMENTS

| 4,836,348 | A | * | 6/1989 | Knodel et al. | ........... 192/53.341 |
|---|---|---|---|---|---|
| 5,085,303 | A | * | 2/1992 | Frost | .......................... 192/53.32 |
| 5,113,985 | A | * | 5/1992 | Frost | ........................ 192/53.341 |
| 5,135,087 | A | * | 8/1992 | Frost | .......................... 192/53.31 |
| 5,211,068 | A | * | 5/1993 | Spitale et al. | .................. 74/339 |
| 5,267,636 | A | * | 12/1993 | Fielding | ..................... 192/53.34 |
| 5,758,753 | A | * | 6/1998 | Sypula et al. | ............. 192/53.32 |
| 5,862,900 | A | * | 1/1999 | Sailler et al. | ............... 192/53.34 |
| 7,287,443 | B2 | * | 10/2007 | Kuhstrebe et al. | ............. 74/335 |
| 7,506,739 | B2 | * | 3/2009 | Razzacki | .................. 192/53.361 |
| 7,717,246 | B2 | * | 5/2010 | Hiraiwa | ..................... 192/53.31 |
| 2005/0262957 | A1 | * | 12/2005 | Razzacki | ......................... 74/339 |
| 2007/0199786 | A1 | * | 8/2007 | Hiraiwa | ..................... 192/53.34 |

\* cited by examiner

*Primary Examiner* — William Kelleher
*Assistant Examiner* — Gregory T Prather
(74) *Attorney, Agent, or Firm* — Ralph E. Smith

(57) ABSTRACT

A synchronizer mechanism for synchronizing the rotation of gears between a power input shaft and a power output shaft in a manual transmission includes a hub and a synchronizer sleeve disposed about the hub and moveable relative thereto into and out of engagement with adjacent gears to synchronize the rotation of the adjacent gears with the rotation of the power input shaft. An indexing mechanism is employed for indexing the synchronizer sleeve into and out of engagement with adjacent gears. The indexing mechanism includes a retaining mechanism and a detent portion having a main synchronization detent and at least one second synchronization detent disposed laterally adjacent the main synchronization detent. The main synchronization detent causes an intermediate clutch ring to contact a cylindrical cone portion on a gear and begin the change in angular velocity of the gear and to begin the synchronization sequence of the mechanism at a first time. The second synchronization detent causes the intermediate clutch ring to contact a cylindrical cone portion on a gear and change the angular velocity of the gear and synchronizer mechanism at a second time reducing the minor speed difference between the gear and synchronizer sleeve caused by loss of synchronization between the time of sleeve and ring indexing and initial engagement contact of the sleeve to the clutch teeth of the gear.

15 Claims, 4 Drawing Sheets

SYNCHRONIZER RE-ENERGIZATION FOR IMPROVED COLD SHIFT COMFORT

FIELD OF THE INVENTION

Embodiments disclosed herein relate generally to transmissions and, more particularly, to a synchronizer mechanism for synchronizing rotation of gears in a manual transmission.

BACKGROUND OF THE INVENTION

Drive linkages are employed in automotive vehicles between the prime mover, typically an internal combustion engine, and the driven wheels. Such drive linkages generally include a line of rotating components from the rotating output of the engine to the rotating input of the driven wheels. A transmission is typically employed in order to vary the ratio of speeds between the engine output and the driven wheel input. The transmission is shifted to give the operating speeds or power ratios required. A clutch, torque converter or fluid coupling is also employed for interrupting power transmission between the engine output and the driven wheels.

A manual transmission typically includes two shafts, one forming the input shaft to which power is applied and the other forming the output shaft that is ultimately connected, usually through a differential mechanism, to the driven wheels. In its most common form, at least two pair of mated gears are mounted respectively on the input and output shafts, and the respective pairs of gears are continuously engaged with one another. One gear of each pair is keyed non-rotatably to its respective shaft while the other is freely rotatable on its respective shaft. Thus, although the gears are continually meshed, with nothing more, rotation of the input power shaft does nothing to cause rotation of the output shaft.

In order to selectively key the rotatably mounted gear to its respective shaft, a gear clutch or synchronizer is located adjacent the rotatably mounted gear. A synchronizer mechanism is one common form of gear clutch. Synchronizer mechanisms are small clutches maintained engaged by the change-speed control during the time required to obtain the equalization of the angular speeds of the elements to be clutched, e.g., the adjacent gears. In these synchronizer mechanisms, a synchronizer sleeve is disposed about a hub fixed to a shaft. The sleeve is moveable axially relative to the hub on the shaft and into or out of engagement with the adjacent gear. The sleeve includes an indexing mechanism having retaining mechanisms. The synchronizer mechanism also includes an intermediate clutch ring between an adjacent gear and the sleeve. The intermediate clutch ring includes an interior cone shaped surface that interacts during gear selection with an exterior cone shaped surface on the adjacent gear through friction. The intermediate clutch ring also includes external gear teeth that are engaged by internal splines on the sleeve. During gear selection, a shift lever moves the sleeve axially along the shaft in the direction of the intermediate clutch ring and an adjacent gear. As the sleeve moves, the external gear teeth of the intermediate clutch ring and the internal splines of the sleeve contact one another and cause the intermediate clutch ring and the sleeve to rotate with the same angular velocity. However, the internal splines of the sleeve are prevented from fully engaging with the external gear teeth of the intermediate clutch ring until the angular velocities of the adjacent gear and the intermediate clutch ring are the same. Simultaneously, the retaining mechanism of the sleeve forces a strut of the retaining mechanism to move laterally and contact the intermediate clutch ring. As the strut contacts the intermediate clutch ring, the interior cone shaped surface of the intermediate clutch ring is forced against the exterior cone shaped surface of the adjacent gear. The contact between the interior cone shaped surface of the intermediate clutch ring and the exterior cone shaped surface of the adjacent gear creates friction and causes the adjacent gear and intermediate clutch ring to rotate at the same angular velocity.

Once the angular velocities of the adjacent gear and the intermediate clutch ring are approximately the same, the internal splines of the sleeve fully engage with the external gear teeth of the intermediate clutch ring as the sleeve is moved further in the direction of the intermediate clutch ring and the adjacent gear. The further movement of the sleeve in the direction of the adjacent gear causes the retaining mechanism to be overcome. Once the retaining mechanism is overcome, the retaining mechanism no longer forces the strut against the intermediate clutch ring. As a result, the interior cone shaped surface of the intermediate clutch ring is no longer forced against the exterior cone shaped surface of the adjacent gear and friction between the interior cone shaped surface of the intermediate clutch ring and the exterior cone shaped surface of the adjacent gear is removed. The sleeve subsequently becomes fully engaged with the adjacent gear. However, there is a lapse of time between when the sleeve is fully engaged with the intermediate clutch ring and when the sleeve becomes engaged with the adjacent gear. The removal of friction between the interior cone shaped surface of the intermediate clutch ring and the exterior cone shaped surface of the adjacent gear coupled with drag present within the transmission may cause the adjacent gear to change in angular velocity relative to the intermediate clutch ring and the sleeve. This problem is particularly pronounced in colder weather and before the transmission has had the opportunity to warm to operating temperature. When this happens, the adjacent gear and the sleeve are forced together while having different angular velocities. Forcing the adjacent gear and sleeve together increases wear on transmission parts, thereby decreasing service life. In addition, forcing the adjacent gear and sleeve together while they are rotating with different angular velocities may result in difficult, loud and notchy shifting, which is undesirable.

It is, therefore, desirable to provide a synchronizer mechanism for a manual transmission that overcomes the problems when friction is lost between the interior cone shaped surface of the intermediate clutch ring and the exterior cone shaped surface of the adjacent gear as the synchronizer sleeve fully engages with the intermediate clutch ring.

BRIEF SUMMARY OF THE INVENTION

In an example embodiment, a synchronizer arrangement for a manual transmission having a first shaft, a second shaft, and a plurality of gears carried on the first and second shafts is provided. The plurality of gears of the manual transmission are intermeshed for transferring power therebetween. The synchronizer arrangement includes a hub fixed for rotation on one of the first or second shafts and a synchronizer sleeve slidably coupled to the hub and axially movable thereon. The synchronizer sleeve is axially movable in a first direction from a neutral position to a first operative position in which the synchronizer sleeve operatively couples with a first gear of the plurality of gears. The synchronizer sleeve further includes means for synchronizing the rotation of the synchronizer sleeve with the rotation of the first gear for first and second times.

In another example embodiment, a manual transmission having a power input shaft, a power output shaft, and a plurality of gears carried on the power input and power output shafts and intermeshed therebetween for transferring power from the power input shaft to the power output shaft is provided. The manual transmission also includes a synchronizer mechanism having a hub, intermediate clutch ring and a synchronizer sleeve disposed about the hub and moveable relative thereto into and out of engagement with adjacent gears. The synchronizer mechanism synchronizes the rotation of the adjacent gears with the rotation of the synchronizer mechanism a first and a second time as the sleeve is moved into engagement with the adjacent gear.

One advantage of the disclosed embodiments is that an improved synchronizer mechanism is provided for a manual transmission. The synchronizer mechanism energizes the intermediate clutch ring two times as the synchronizer sleeve is moved from the neutral position to an adjacent gear, thereby minimizing the difference in angular velocities of the synchronizer sleeve and adjacent gear as the two components are engaged.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an exemplary embodiment which is illustrated in the accompanying drawings. The technology is capable of other embodiments and of being practiced and earned out in various ways. Also, it is to be understood that the phraseology and terminology employed are for the purpose of description and should not be regarded as limiting.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

Figure 1:
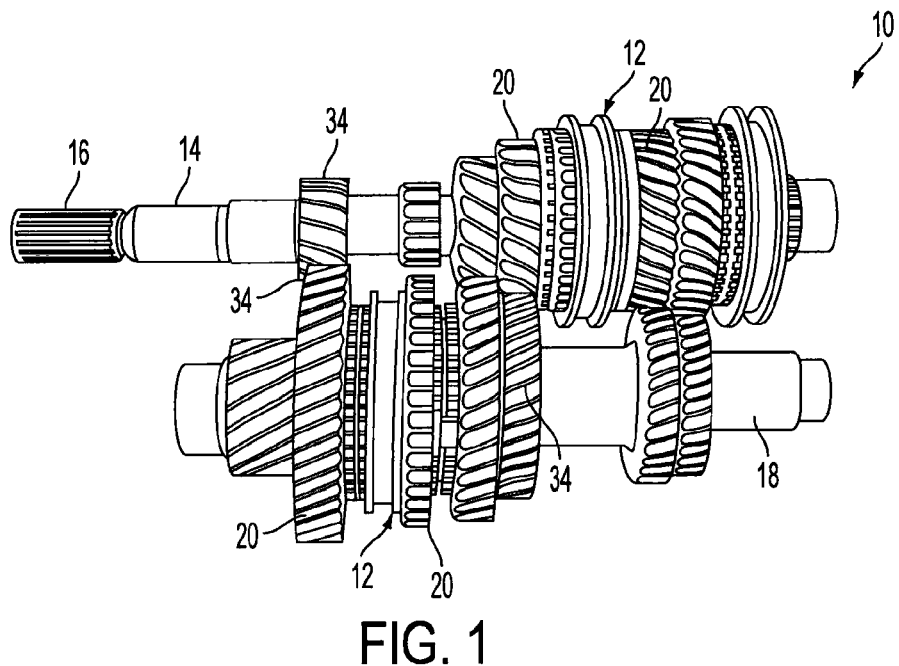
FIG. 1 is a perspective view of a pair of shafts having intermeshed gears in a manual transmission.

FIG. 1 illustrates a perspective view of a pair of shafts 14, 18 having intermeshed gears 20 in a manual transmission 10. The manual transmission 10 includes synchronizing mechanisms, generally indicated at 12 (and described below in more detail), for synchronizing the rotation of gears 20 disposed between a power input shaft 14 and a power output shaft 18.

The power input shaft 14 is operatively coupled through a splined portion 16 to a prime mover, such as an internal combustion engine, not shown. Similarly, the output shaft 18 is operatively coupled through a differential to the driven wheels, both of which are not shown. A plurality of gears 20 are carried by either the power input shaft 14 or power output shaft 18 and are intermeshed therebetween for transferring power from the prime mover through the power input shaft 14 to the power output shaft 18 and further to the driven wheels. The transmission 10 further includes a plurality of synchronizer mechanisms 12 disposed between adjacent gears 20 to synchronize their rotation as will be described below.

Figure 2:
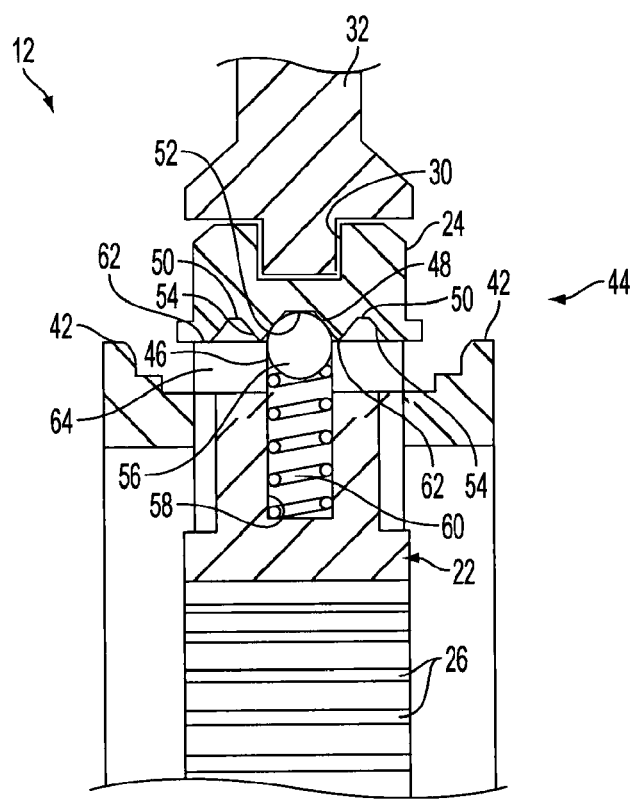
FIG. 2 is a partial sectional view of a synchronizing mechanism according to an embodiment disclosed herein.
Figure 6:
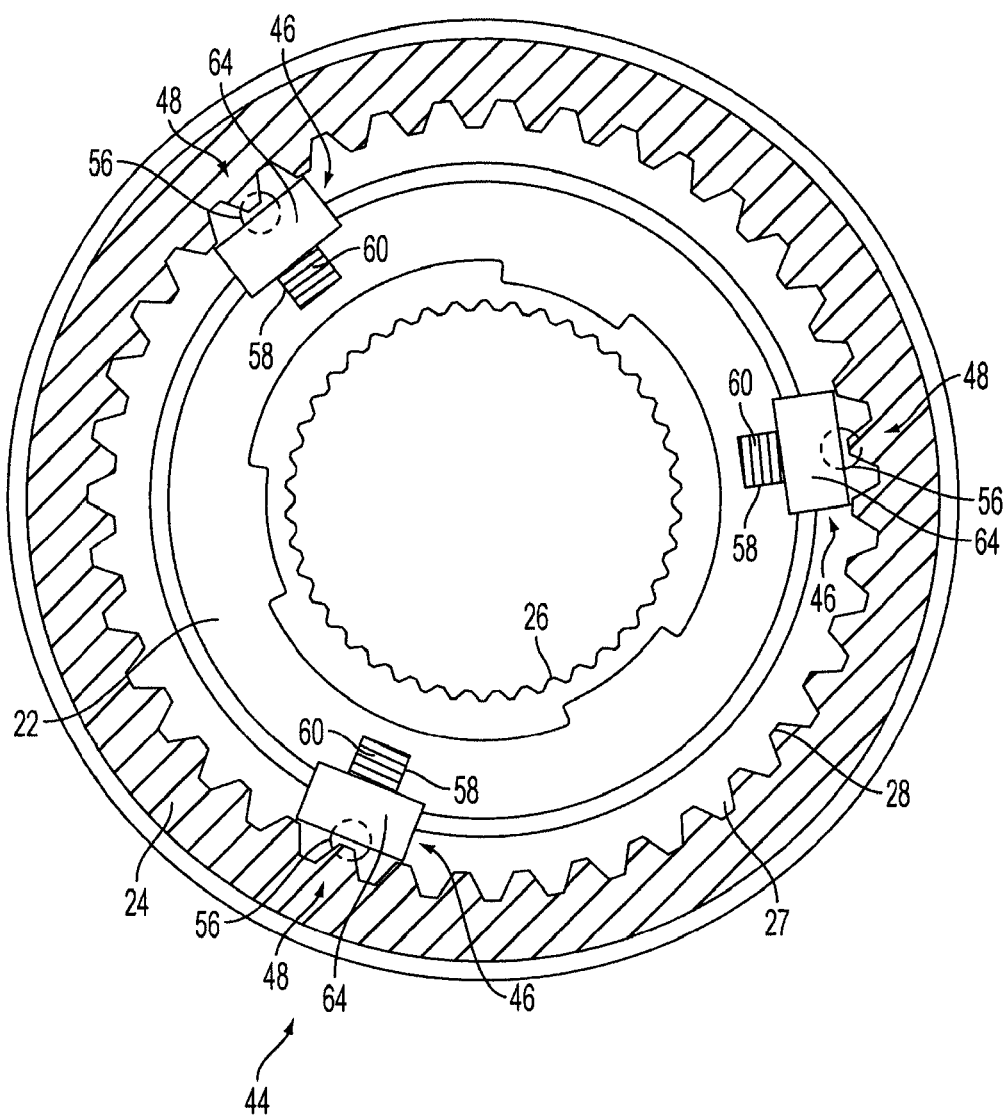
FIG. 6 is a side view of the synchronizer mechanism in FIGS. 2 through 5 illustrating the indexing mechanism in phantom.

FIG. 2 illustrates a partial sectional view of a synchronizing mechanism 12 according to an embodiment disclosed herein. Each synchronizer mechanism 12 includes a hub 22 fixed for rotation with one of the shafts 14, 18 in the transmission 10 and between pairs of gears 20. Each synchronizer mechanism 12 also includes a synchronizer sleeve 24 disposed about the hub 22 and moveable relative thereto into and out of engagement with adjacent gears 20 to synchronize the rotation of the adjacent gears 20 with the rotation of the power input shaft 14 or the power output shaft 18. Each hub 22 includes splines 26 on its inner diameter that are fixed to either the power input shaft 14 or the power output shaft 18, as the case may be. The hubs 22 are also externally splined 27 as shown in FIG. 6. Similarly, each synchronizing sleeve 24 includes internal splines 28 (FIG. 6) that cooperate with the external splines 27 of the hub 22. The synchronizer sleeves 24 are movable relative to the hub 22 in a direction of the splines 27, 28 and parallel to the axis of the respective shaft 14, 18. Referring again to FIG. 2, each synchronizing sleeve 24 includes an external annular groove 30 adapted to receive a shift lever 32 to move the synchronizer sleeve 24 into and out of engagement with the adjacent gears 20.

Figure 3:
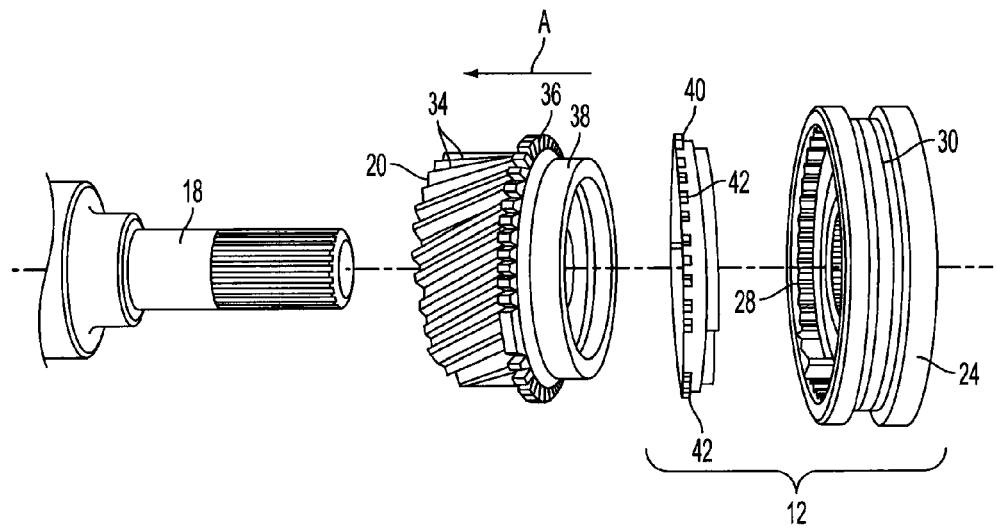
FIG. 3 is an exploded view of a portion of the manual transmission including the synchronizer mechanism of FIG. 2.

FIG. 3 illustrates an exploded view of a portion of the manual transmission 10 including the synchronizer mechanism 12 of FIG. 2. Each of the plurality of gears 20 carried on the power input shaft 14 and power output shaft 18 includes external gear teeth 34 to be meshed with the external gear teeth 34 of another gear 20 on a different shaft 14, 18. Additionally, each gear 20 includes clutch teeth 36 disposed on and near one distal end of the gear 20 and adjacent its associated synchronizer mechanism 12. Each gear 20 further includes a cylindrical cone portion 38 extending axially from the gear 20 and in the direction of the adjacent synchronizer mechanism 12.

An intermediate clutch ring 40 is disposed between each synchronizer mechanism 12 and its adjacent gears 20. The intermediate clutch ring 40 includes external gear teeth 42 and has a conical inner surface. The intermediate clutch ring 40 is carried on and is moveable relative to the cylindrical cone portion 38 of the adjacent gear 20. The external gear teeth 42 of the intermediate clutch ring 40 are engaged by the internal splines 28 on the synchronizer sleeve 24 when the synchronizer sleeve 24 is moved into engagement with each adjacent gear 20. At the same time, the intermediate clutch ring 40 is moved relative to the cylindrical cone portion 38 of the adjacent gear 20 such that the conical inner surface of the intermediate clutch ring 40 engages the cylindrical cone portion 38 of the gear 20 to begin synchronization of the gear 20 and the intermediate clutch ring 40. Once synchronization of the gear 20 and the intermediate clutch ring 40 is complete, the synchronizer sleeve 24 moves in the direction of the intermediate clutch ring 40 and the gear 20 to fully engage the intermediate clutch ring 40 (see arrow A). The synchronizer sleeve 24 continues to move in the direction of the intermediate clutch ring 40 and the gear 20 and engages the gear 20 to lock the gear 20 to its respective shaft 14, 18.

Each synchronizing mechanism 12 further includes an indexing mechanism, generally shown at 44 in FIG. 2, for indexing the synchronizer sleeve 22 into and out of engagement with the adjacent gears 20. Referring again to FIG. 6, the indexing mechanism 44 includes at least one, but preferably a plurality of, retaining mechanisms 46. The retaining mechanisms 46 include a ball 56 and strut 64, which are disposed between the hub 22 and the synchronizer sleeve 24. The strut 64 disposed between the hub 22 and the synchronizer sleeve 24 is movable relative to the hub 22. The strut 64 at least partially surrounds the ball 56. The indexing mechanism 44 also includes at least one, but preferably a plurality of, detent portions 48 disposed internally on the synchronizer sleeve 24 and corresponding to each retaining mechanism 46. Preferably, the indexing mechanism 44 includes three retaining mechanisms 46 and three detent portions 48 corresponding to each of the retaining mechanisms 46. Each pair of corresponding retaining mechanisms 46 and detent portions 48 are equally spaced relative to an adjacent pair of corresponding retaining mechanisms 46 and detent portions 48.

Referring again to FIG. 2, each detent portion 48 has a main synchronization detent 52 disposed between a pair of adjacent second synchronization detents 50. In one embodiment, each detent portion 48 has a main synchronization detent 52 located in the center of the synchronization sleeve 24 and a single second synchronization detent 50 located adjacent one side of the main synchronization detent 52. Each second synchronization detent 50 and the main synchronization detent 52 of each detent portion 48 are bounded on either side thereof by stop surfaces 54. The ball 56 enters into engagement with the main synchronization detent 52 and the second synchronization detents 50 on the detent portion 48 depending upon the status of the shifting operation. The ball 56 is in engagement with the main synchronization detent 52 while the sleeve 24 is not engaged with any gear 20 and as the sleeve 24 is first engaged with the intermediate clutch ring 40. The ball 56 is depressed by the lands 62 during the time in which the sleeve 24 is no longer first engaged with the intermediate clutch ring 40, but is not yet fully engaged with the intermediate clutch ring 40. The ball 56 is in engagement with one of the second synchronization detents 50 once the sleeve 24 is fully engaged with the intermediate clutch ring 40 but before the sleeve 24 is engaged with the adjacent gear 20. Once the sleeve 24 is fully engaged with the gear 20, the ball 56 becomes fully depressed by the lands 62 again. The ball 56 of FIG. 2 is shown in engagement with the main synchronization detent 52. The retaining mechanism 46 further includes a slot 58 extending radially inward from the outer radial surface of the hub 22 and a coiled spring 60 disposed within the slot 58 and between the hub 22 and the ball 56. The coiled spring 60 operates to urge the ball 56 into engagement with the second synchronization detents 50 as well as the main synchronization detent 52. When the ball 56 is in the main synchronization detent 52 or the second synchronization detent 50, the strut 64 is laterally moved in conjunction with the sleeve 24, thereby laterally moving the intermediate clutch ring 40 into frictional engagement with the cylindrical cone portion 38 of the gear 20.

Referring to FIGS. 2 and 3, during a shifting operation in which a gear is to be engaged, the shift lever 32 exerts a lateral force along the axis of the input shaft 14 (or output shaft 18). The lateral force exerted by the shift lever 32 is applied to the synchronizer sleeve 24. Then, the stop surfaces 54 of the main synchronization detent 52 exert a lateral force against the ball 56 which, in turn, exerts a lateral force against the strut 64 of the synchronizer mechanism 12. The lateral force exerted by the shift lever 32 causes the synchronizer sleeve 24 and the strut 64 to move laterally in the direction of the intermediate clutch ring 40 and the adjacent gear 20. Although not explicitly shown, as the strut 64 moves laterally, the strut 64 contacts the intermediate clutch ring 40 causing the conical inner surface of the intermediate clutch ring 40 to contact the cylindrical cone portion 38 of the gear 20 which is to be engaged. Likewise, the lateral movement of the synchronizer sleeve 24 causes the internal splines 28 of the synchronizer sleeve 24 to partially contact the external gear teeth 42 of the intermediate clutch ring 40 and lock the synchronizer sleeve 24 and intermediate clutch ring 40 together at the same angular velocity. Contact between the conical inner surface of the intermediate clutch ring 40 and the cylindrical cone portion 38 of the gear 20 creates friction, which causes the angular speeds of the intermediate clutch ring 40 and the gear 20 to be the same.

Figure 4:
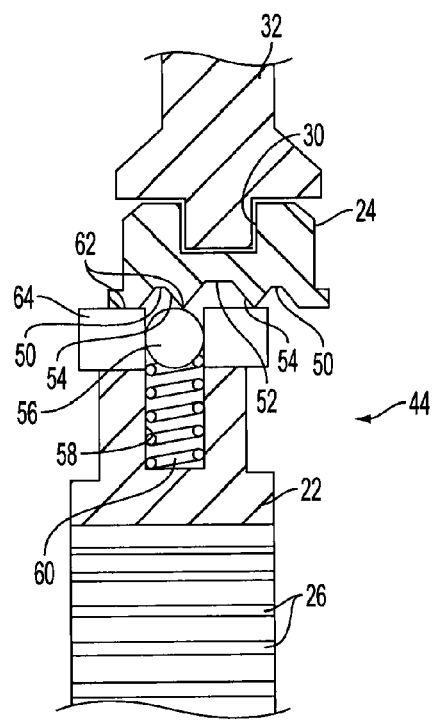
FIG. 4 is a partial sectional view of the synchronizer mechanism according to an embodiment disclosed herein.

Referring also to FIG. 4, once the intermediate clutch ring 40 and the gear 20 have the same angular speed, the synchronizer sleeve 24 is permitted by the intermediate clutch ring 40 to become fully engaged with the intermediate clutch ring 40. As a result, the synchronizer sleeve 24 overcomes the force of the ball 56 of the retaining mechanism 44 and the synchronizer sleeve 24 moves laterally relative to the hub 22. The lateral movement of the synchronizer sleeve 24 causes the ball 56 of the retaining mechanism 46 to be depressed by the lands 62 of the synchronizer sleeve 24 and leave the main synchronization detent 52. As a result, the ball 56 is temporarily depressed by the lands 62 and the lateral force asserted by the shift lever 32 is no longer transmitted to the strut 64. Thus, the strut 64 no longer transmits lateral force to the intermediate clutch ring 40 and the frictional engagement between the conical inner surface of the intermediate clutch ring 40 and the cylindrical cone portion 38 of the gear 20 is limited to the friction from the lateral force created by the movement of the synchronizer sleeve 24 into full engagement with the intermediate clutch ring 40.

Figure 5:
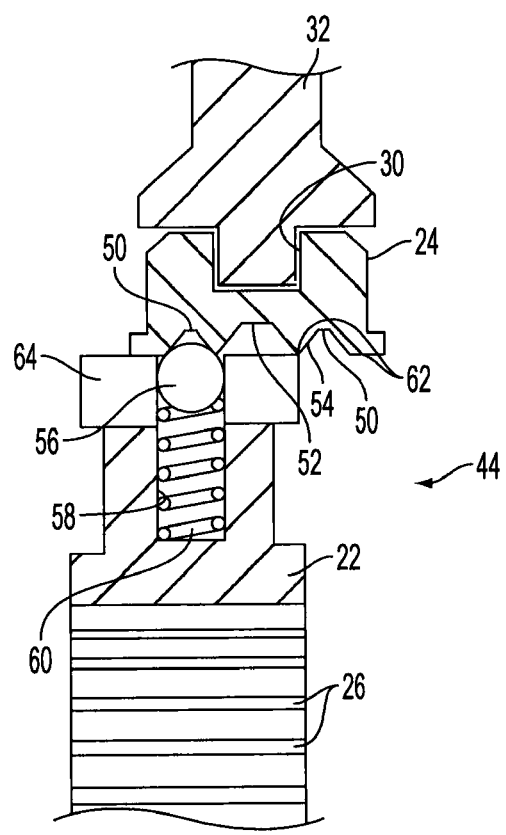
FIG. 5 is a partial sectional view of the synchronizer mechanism according to an embodiment disclosed herein.

Referring now to FIG. 5, as the shift lever 32 continues to move the synchronizer sleeve 24 laterally towards the gear 20 and the intermediate clutch ring 40, the synchronizer sleeve 24 becomes fully engaged with the intermediate clutch ring 40. At the same time, the ball 56 aligns with a second synchronization detent 50, located adjacent to the main synchronization detent 52 on the synchronizer sleeve 24. The shift lever 32 continues to apply pressure to the synchronization sleeve 24. Accordingly, the stop surfaces 54 of the second synchronization detent 50 exert a lateral force against the ball 56 which, in turn, exerts a lateral force against the strut 64 of the synchronizer mechanism 12. The lateral force exerted by the shift lever 32 causes the synchronizer sleeve 24, the strut 64 and the intermediate clutch ring 40 to move laterally in the direction of the adjacent gear 20. As the synchronizer sleeve 24, the strut 64 and the intermediate clutch ring 40 move laterally towards the gear 20, the conical inner surface of the intermediate clutch ring 40 makes contact for a second time with the cylindrical cone portion 38 of the gear 20 which is to be engaged. Contact between the conical inner surface of the intermediate clutch ring 40 and the cylindrical cone portion 38 of the gear 20 creates friction for a second time which causes for a second time the difference in the angular speeds of the intermediate clutch ring 40 and the gear 20 to be minimized. The second synchronization period accommodates for loss of synchronization that may have occurred while the ball 56 was depressed by the lands 62 of the synchronization sleeve 24 as the synchronization sleeve 24 moved into initial engagement with the clutch teeth 36 of the gear 20.

As the shifting operation continues, the shift lever 32 exerts a lateral force against the synchronizer sleeve 24 causing the synchronizer sleeve 24 to move laterally yet again. As a result, the synchronizer sleeve 24 overcomes the force of the ball 56 of the retaining mechanism 44 and the ball 56 becomes depressed for a second time by the lands 62. The synchronizer sleeve 24 moves laterally in the direction of the gear 20 and the internal splines 28 of the synchronizer sleeve 24 become fully engaged with the clutch teeth 36 of the gear 20. Accordingly, the shifting operation is completed.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

Thus, the embodiments disclosed provide an improved synchronizer mechanism for a manual transmission. The synchronizer mechanism energizes the intermediate clutch ring two times as the synchronizer sleeve is moved from the neutral position to an adjacent gear, thereby minimizing the difference in angular velocities of the synchronizer sleeve and adjacent gear as the two components are engaged.

What is claimed is:

1. A method of using a synchronizer arrangement for a manual transmission having a first shaft, a second shaft, and a plurality of gears carried on said first and second shafts, said plurality of gears adapted to be intermeshed for transferring power therebetween, said method comprising:
    moving a synchronizer sleeve that is slidably coupled to a hub fixed for rotation on one of the first or second shafts by axially moving the synchronizer sleeve along said hub in a first direction from a neutral position to a first operative position whereby said synchronizer sleeve operatively couples with a first gear of said plurality of gears; and
    synchronizing the rotation of said synchronizer sleeve with the rotation of said first gear at first and second times during engagement of the first gear.

2. The method of claim 1, further comprising:
    moving said synchronizer sleeve by axially moving the synchronizer sleeve along said hub in a second direction from said neutral position to a second operative position whereby said synchronizer sleeve operatively couples with a second gear of said plurality of gears; and
    synchronizing the rotation of said synchronizer sleeve with the rotation of said second gear at first and second times during engagement of the second gear.

3. The method of claim 2, further comprising using an indexing mechanism in order to synchronize the rotation of said synchronizer sleeve with the rotation of said first and said second gears, said indexing mechanism comprising:
    a plurality of retaining mechanisms radially located along the outer surface of said hub; and
    a plurality of detent portions radially located along the inner surface of said synchronizer sleeve and disposed opposite to said plurality of retaining mechanisms.

4. The method of claim 3, wherein using an indexing mechanism includes, for each of said plurality of detent portions:
    engaging a main synchronization detent laterally centered on said synchronization sleeve; and
    engaging at least one of a pair of second synchronization detents, wherein a first detent of said pair of second synchronization detents is disposed adjacent a first lateral portion of said main synchronization detent and a second detent of said pair of second synchronization detents is disposed adjacent a second lateral portion of said main synchronization detent opposite to said first detent of said pair of second synchronization detents.

5. The method of claim 3, wherein using an indexing mechanism includes engaging at least some of the plurality of detent portions via at least some of the plurality of retaining mechanisms, wherein each of said plurality of retaining mechanisms further comprises:
    a slot extending radially in said hub;
    a spring disposed in said slot;
    a strut at least partially disposed in said slot; and
    a ball at least partially disposed in said slot and at least partially surrounded by said strut, wherein said spring forces said ball outwards from said slot and into contact with a detent of said plurality of detent portions.

6. The method of claim 3, further comprising engaging said first gear using a first intermediate clutch ring and engaging said second gear using a second intermediate clutch ring, wherein
    said first intermediate clutch ring is between said first gear and said synchronization sleeve; and
    said second intermediate clutch ring is between said second gear and said synchronization sleeve; and
    wherein said first intermediate clutch ring and said second intermediate clutch ring further comprise a conical inner surface, said first gear and said second gear each further comprising a cylindrical cone portion, said conical inner surface of said first intermediate clutch ring being configured to mate with said cylindrical cone portion of said first gear, said conical inner surface of said second intermediate clutch ring being configured to mate with said cylindrical cone portion of said second gear.

7. The method of claim 1, further comprising using an indexing mechanism in order to synchronize the rotation of said synchronizer sleeve with the rotation of said first gear, said indexing mechanism comprising:
    a plurality of retaining mechanisms radially located along the outer surface of said hub; and
    a plurality of detent portions radially located along the inner surface of said synchronizer sleeve and disposed opposite to said plurality of retaining mechanisms.

8. The method of claim 7, wherein using an indexing mechanism includes, for each of said plurality of detent portions:

engaging a main synchronization detent laterally centered on said synchronization sleeve; and engaging a second synchronization detent, wherein said second synchronization detent is disposed adjacent a lateral portion of said main synchronization detent.

9. The method of claim 7, wherein using an indexing mechanism includes engaging at least some of the plurality of detent portions via at least some of the plurality of retaining mechanisms, wherein each of said plurality of retaining mechanisms further comprises:

a slot extending radially in said hub;

a spring disposed in said slot;

a strut at least partially disposed in said slot; and a ball at least partially disposed in said slot and at least partially surrounded by said strut, wherein said spring forces said ball outwards from said slot and into contact with a detent of said plurality of detent portions.

10. The method of claim 7, further comprising engaging said first gear using a first intermediate clutch ring, wherein said first intermediate clutch ring further comprises a conical inner surface;

said first gear further comprises a cylindrical cone portion; and wherein said conical inner surface of said first intermediate clutch ring is configured to mate with said cylindrical cone portion of said first gear.

11. A method of using a manual transmission comprising a power input shaft, a power output shaft, a plurality of gears carried on said power input and power output shafts and adapted to be intermeshed therebetween for transferring power from said power input shaft to said power output shaft, and a synchronizer mechanism including a hub, an intermediate clutch ring and a synchronizer sleeve disposed about said hub, the method comprising:

moving said synchronizer sleeve relative to said hub into and out of engagement with adjacent gears to synchronize the rotation of said adjacent gears with the rotation of said synchronizer mechanism; and synchronizing the rotation of said synchronizer mechanism and an adjacent gear at first and second times as said sleeve is moved into engagement with said adjacent gear.

12. The method of claim 11, further comprising using an indexing mechanism for indexing said synchronizer sleeve into and out of engagement with said adjacent gears, said indexing mechanism including a plurality of retaining mechanisms disposed on the outer side of said hub and an equal number of detent portions disposed internally on said synchronizer sleeve and corresponding to said retaining mechanisms, each of said detent portions including means for locating said synchronizer sleeve laterally relative to said hub at a main synchronization position and at least one second synchronization position, each of said retaining mechanisms receivable at a main synchronization detent of said detent portions corresponding to said main synchronization positions and at a second synchronization detent of said detent portions corresponding to said second synchronization positions.

13. The method of claim 12, further comprising engaging said plurality of gears using said intermediate clutch rings, wherein:

said plurality of gears further comprise a cylindrical cone portion extending axially from at least one of said plurality of gears in the direction of said synchronizer mechanism; and said intermediate clutch rings are disposed between said synchronizer mechanism and each of said adjacent gears, said intermediate clutch rings further comprising a conical inner surface and being carried on and moveable relative to said cylindrical cone portion of said adjacent gear.

14. The method of claim 13, wherein said main synchronization detent presses said conical inner surface of said intermediate clutch ring against said cylindrical cone portion of an adjacent gear at a first time and said second synchronization detent presses said conical inner surface of said intermediate clutch ring against said cylindrical cone portion of said adjacent gear at a second time as said sleeve is moved into engagement with said adjacent gear.

15. The method of claim 12, wherein using an indexing mechanism includes engaging at least some of the detent portions via at least some of the plurality of retaining mechanisms, wherein each of said retaining mechanisms further comprises:

a slot extending radially inward from the outer radial surface of said hub;

a ball at least partially disposed in said slot and biased between said hub and said synchronizer sleeve;

a strut at least partially disposed in said slot and biased between said hub and said synchronizer sleeve, wherein said strut at least partially surrounds said ball; and a spring disposed within said slot and between said hub and said ball, wherein said spring forces said ball into engagement with said main synchronization detent when said synchronization sleeve is in said main synchronization position, and into engagement with said second synchronization detent when said sleeve is in said second synchronization position.

* * * * *